(12) United States Patent
Uno et al.

(10) Patent No.: US 7,102,825 B2
(45) Date of Patent: Sep. 5, 2006

(54) COLLIMATOR OPTICAL SYSTEM AND OPTICAL INFORMATION STORAGE DEVICE

(75) Inventors: Kazushi Uno, Kawasaki (JP); Shingo Hamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/304,570

(22) Filed: Dec. 16, 2005

(65) Prior Publication Data

US 2006/0092523 A1   May 4, 2006

Related U.S. Application Data

(60) Division of application No. 11/098,525, filed on Apr. 5, 2005, now Pat. No. 7,002,758, which is a continuation of application No. PCT/JP02/12512, filed on Nov. 29, 2002.

(51) Int. Cl.
G02B 27/10 (2006.01)
G02B 13/18 (2006.01)
G02B 3/02 (2006.01)
G11B 7/135 (2006.01)

(52) U.S. Cl. .................. 359/641; 359/719; 369/112.03

(58) Field of Classification Search ................ 359/641, 359/719, 738; 369/112.03, 112.05, 112.07, 369/121

See application file for complete search history.

(56) References Cited

U.S. PATENT DOCUMENTS

| 5,051,872 A | 9/1991 | Anderson |
| 5,751,501 A | 5/1998 | Li |
| 6,105,869 A * | 8/2000 | Scharf et al. ............... 235/454 |
| 6,144,508 A | 11/2000 | Bransome |

FOREIGN PATENT DOCUMENTS

| JP | 59-15204 | 1/1984 |
| JP | 7-210892 | 8/1995 |
| JP | 8-43702 | 2/1996 |
| JP | 10-10453 | 1/1998 |
| JP | 11-194289 | 7/1999 |
| JP | 2000-315341 | 11/2000 |
| JP | 2001-160238 | 6/2001 |
| JP | 2002-14269 | 1/2002 |

\* cited by examiner

*Primary Examiner*—Alicia M Harrington
(74) *Attorney, Agent, or Firm*—Staas & Halsey LLP

(57) ABSTRACT

The present invention is intended, as an object thereof, to improve stability against both temperature changes and light source output changes, and includes an achromatic lens having a composite structure of glass or a plastic lens having a diffraction grating counteracting a focal length change due to a wavelength change of light, where a lens holder is adhered to an opposite side to a light source of an overhang of the achromatic lens made of glass while the lens holder is adhered to a light source side of the overhang of the plastic lens with the diffraction grating.

5 Claims, 8 Drawing Sheets

COLLIMATOR OPTICAL SYSTEM AND OPTICAL INFORMATION STORAGE DEVICE

CROSS-REFERENCE TO RELATED APPLICATIONS

This application claims benefit under 35 U.S.C. § 120 as a divisional of application Ser. No. 11/098,525, filed Apr. 5, 2005 now U.S. Pat. No. 7,002,758 and entitled "COLLIMATOR OPTICAL SYSTEM AND OPTICAL INFORMATION STORAGE DEVICE," which is hereby incorporated by reference in its entirety into this application, and which was a continuation application, filed under 35 U.S.C. § 111(a), of International Application No. PCT/JP02/12512, filed Nov. 29, 2002.

TECHNICAL FIELD

The present invention relates to a collimator optical system that converts diffused pencils of light to parallel pencils of light and an optical information storage device that reads information from an information recording medium by means of light.

BACKGROUND ART

Conventionally, an optical disk device that reads and records information by means of light by using an optical disk such as a CD, a CD-ROM, a CD-R, a DVD, a PD, an MO or an MD as an information recording medium is known as a kind of an optical information storage device. Importance is attached to such an optical disk device because the optical disks are characterized by replaceability, large capacity, small size and lightweight. A small and low-cost laser diode is generally used as a light source of the optical information storage device represented by such an optical disk device. As the laser diode emits diffused pencils of light, there are many cases where the optical information storage device has a collimator optical system built therein for the sake of converting the diffused pencils of light to parallel pencils of light.

Presently, a large-capacity optical information storage device is under development at a rapid rate as a personal recording device of high reliability for future digital videos and broadband networks. Rendering a light source wavelength of the optical information storage device shorter and rendering an objective lens forming a focusing spot on the information recording medium higher-NA (numerical aperture) are helpful answers for the sake of reducing a diameter of the focusing spot used for recording and reproduction to realize larger capacity. If rendered shorter-wavelength and higher-NA, however, aberrations accompanying a change in ambient temperature and a switch of laser output become larger and optical stability is reduced.

Conventionally, there are some proposed optical systems having improved the optical stability against the change in ambient temperature (refer to patent documents 1, 2, 3 and 4 indicated below for instance).
(Patent Document 1)
Japanese Patent Laid-Open No. 59-15204
(Patent Document 2)
Japanese Patent Laid-Open No. 8-43702
(Patent Document 3)
Japanese Patent Laid-Open No. 11-194289
(Patent Document 4)
Japanese Patent Laid-Open No. 2002-14269

As for an optical information recording device represented by the optical disk device and the collimator optical system built into the optical information recording device, however, it is necessary to consider a change in the light source wavelength and a change in focal length of the lens as changes in conjunction with a temperature change. In addition, it is necessary to cope with the change in the light source wavelength caused by the switch of laser output when there is no temperature change. Furthermore, it is essential for the collimator optical system of the optical disk device to become smaller, and so simplification of structure and easiness of assembly must also be considered.

DISCLOSURE OF THE INVENTION

In view of the circumstances, an object of the present invention is to provide a collimator optical system of a simple structure optically stable against both temperature changes and light source output changes and an optical information storage device of which performance is stable against both the temperature changes and light source output changes.

A first collimator optical system of the present invention achieving the object is characterized by including:
a base;
a light source fixed on the base and emitting diffused pencils of light;
an achromatic lens having an overhang on its rim and having a composite structure of glass, the lens converting diffused pencils of light emitted by the light source to parallel pencils of light; and
a lens holder fixed on the base and adhered to an opposite side to the light source of the overhang of the achromatic lens to hold the achromatic lens.

The first collimator optical system of the present invention includes the achromatic lens, and thereby secures optical stability against light source wavelength changes irrespective of whether or not there is a temperature change. Furthermore, in order to obtain the optical stability against the temperature change in the simple structure, it adopts the structure in which the lens holder is adhered to the opposite side to the light source of the overhang of the achromatic lens. Such a structure causes various aberration factors in conjunction with the temperature change including changes in focal length of the achromatic lens, expansion and contraction of the base and light source wavelength changes to counteract one another. As thermal contraction of the base is the main aberration factor to be counteracted in the first collimator optical system using the achromatic lens made of glass, the overhang of the achromatic lens has the opposite side to the light source connected to the lens holder.

Thus, the first collimator optical system of the present invention is optically stable against both the temperature changes and light source output changes.

In the first collimator optical system of the present invention, it is preferable that the light source be the one emitting blue light.

As a refractive index of the glass indicates significant wavelength dependence (dispersion) against the blue light of which wavelength is 450 nm or less, it is especially effective to reduce the wavelength dependence with the achromatic lens.

In the first collimator optical system of the present invention, it is preferable that the lens holder be fixed on the base at a position more backward than the position at which the overhang of the achromatic lens adheres to the lens holder when the side closer to the light source is a front side.

As the lens holder is thus fixed, there is a free end around the lens of the lens holder, which is freely extendable against the temperature changes with nothing added to fix it. The thermal contraction of the base is the main aberration factor to be counteracted in the first collimator optical system, and so the free end is provided on the "front side" close to the light source. For this reason, it is possible to counteract the aberration factors which cannot be counteracted just by adhesion structure of the achromatic lens to the lens holder by selecting an adequate material for the lens holder and designing it in adequate dimensions so as to improve accuracy of the optical stability against the temperature changes.

Here, it is desirable that the lens holder has a linear expansion coefficient equal to or larger than the linear expansion coefficient of the base. And it is further desirable that the base be metallic and the lens holder be plastic.

An amount of linear expansion of a member is determined by the linear expansion coefficient and length, and the length of the free end of the lens holder is equal to or less than the length of the base from a fixed position of the light source to the fixed position of the lens holder. For this reason, it is desirable, for the sake of counteracting linear expansion of the base, to select a material having the linear expansion coefficient equal to or larger than the linear expansion coefficient of the base as the material of the lens holder.

In general, miniaturization is required of the optical information storage device and space provided to the collimator optical system is small, and so the space to provide the free end is also small. While the linear expansion coefficient of the plastic is different depending on the material, it is generally larger, sometimes by a digit, than that of metal. Thus, it is possible to counteract the aberration factors with small space by using the plastic as the material of the lens holder.

A second collimator optical system that achieves the object is characterized by including:

a base;

a light source fixed on the base and emitting diffused pencils of light;

a plastic lens having an overhang on its rim and a diffraction grating counteracting a focal length change due to the wavelength change of light, the lens converting diffused pencils of light emitted by the light source to parallel pencils of light; and a lens holder fixed on the base and adhered to the light source side of the overhang of the plastic lens to hold the plastic lens.

The second collimator optical system of the present invention includes the plastic lens to which diffraction grating is provided, and thereby secures the optical stability against the light source wavelength changes irrespective of whether or not there is the temperature change. Furthermore, in order to obtain the optical stability against the temperature change in the simple structure, it adopts the structure in which the lens holder is adhered to the light source side of the overhang of the plastic lens. Such a structure causes various aberration factors in conjunction with the temperature changes including the changes in focal length of the plastic lens, expansion and contraction of the base and light source wavelength changes to counteract one another. As the plastic lens and glass lens have the focal length expanded and contracted in mutually opposite directions and the focal length change of the plastic lens is about ten times larger in size than that of the glass lens, it is necessary to have the configuration in which lens movement in the same direction is further added to movement of the plastic lens in conjunction with the expansion and contraction of the base. For this reason, the lens holder is adhered to the light source side of the overhang of the plastic lens in the second collimator optical system.

Thus, the second collimator optical system of the present invention is optically stable against both the temperature changes and light source output changes.

In the second collimator optical system of the present invention, it is also preferable that the light source be the one emitting the blue light.

As the refractive index of the plastic indicates significant wavelength dependence (dispersion) against the blue light of which wavelength is 450 nm or less, it is especially effective to reduce the wavelength dependence by means of the diffraction grating.

In the second collimator optical system of the present invention, it is preferable that the lens holder be fixed on the base at a position more forward than the position at which the overhang of the plastic lens adheres to the lens holder when the side closer to the light source is the front side.

In the second collimator optical system, the focal length change in conjunction with the temperature change is a major aberration factor to be counteracted, and so the free end is provided on the "backside" opposite to the light source. For this reason, it is possible to counteract the aberration factor which cannot be counteracted just by adhesion structure of the plastic lens to the lens holder by selecting the adequate material for the lens holder and designing it in the adequate dimensions so as to improve the accuracy of the optical stability against the temperature changes.

Here, it is desirable that the lens holder has a linear expansion coefficient equal to or larger than the linear expansion coefficient of the base. And it is further desirable that the base be metallic and the lens holder be plastic.

The amount of linear expansion of a member is determined by the linear expansion coefficient and length, and the length of the free end of the lens holder is limited approximately to the distance from the light source to the lens. For this reason, it is desirable, for the sake of causing the linear expansion larger than that caused by the base alone, to select a material having the linear expansion coefficient equal to or larger than the linear expansion coefficient of the base as the material of the lens holder.

In general, miniaturization is required of the optical information storage device and the space provided to the collimator optical system is small, and so the space to provide the free end is also small. While the linear expansion coefficient of the plastic is different depending on the material, it is generally larger, sometimes by a digit, than that of metal. Thus, it is possible to counteract the aberration factor with the small space by using the plastic as the material of the lens holder.

A first optical information storage device of the present invention achieving the object is characterized by including:

a collimator optical system including a base, a light source fixed on the base and emitting diffused pencils of light, an achromatic lens having an overhang on its rim and having a composite structure of glass, the lens converting diffused pencils of light emitted by the light source to parallel pencils of light, and a lens holder fixed on the base and adhered to an opposite side to the light source of the overhang of the achromatic lens to hold the achromatic lens;

a focusing optical system that leads the parallel pencils of light obtained by the collimator optical system and gathers them on an information recording medium having information recorded thereon; and a reproducing section that reproduces the information recorded on the information recording medium by using reflected light gathered on the information recording medium by the focusing optical system and reflected by the information recording medium.

A second optical information storage device of the present invention achieving the object is characterized by including:

a collimator optical system including a base, a light source fixed on the base and emitting diffused pencils of light, a plastic lens having an overhang on its rim and a diffraction grating counteracting a focal length change due to the wavelength change of light, the lens converting diffused pencils of light emitted by the light source to parallel pencils of light, and a lens holder fixed on the base and adhered to the light source side of the overhang of the plastic lens to hold the plastic lens;

a focusing optical system that leads the parallel pencils of light obtained by the collimator optical system and gathers them on an information recording medium having information recorded thereon; and a reproducing section that reproduces the information recorded on the information recording medium by using reflected light gathered on the information recording medium by the focusing optical system and reflected by the information recording medium.

As for the optical information storage device according to the present invention, only basic forms thereof are indicated here. This is just for the purpose of avoiding duplication, and the optical information storage device according to the present invention includes various forms corresponding to the aforementioned forms of the collimator optical system in addition to the basic forms.

In the first and second optical information storage devices of the present invention, the collimator optical system is optically stable against both the temperature changes and light source output changes, and a focusing spot having the light gathered on the information recording medium is stable even if the focusing optical system is high-NA. Therefore, the first and second optical information storage devices of the present invention have performance optically stable against both the temperature changes and light source output changes, and are capable of high-quality recording and reproduction on the optical disk.

BEST MODE FOR CARRYING OUT THE INVENTION

Hereunder, embodiments of the present invention will be described.

Figure 1:
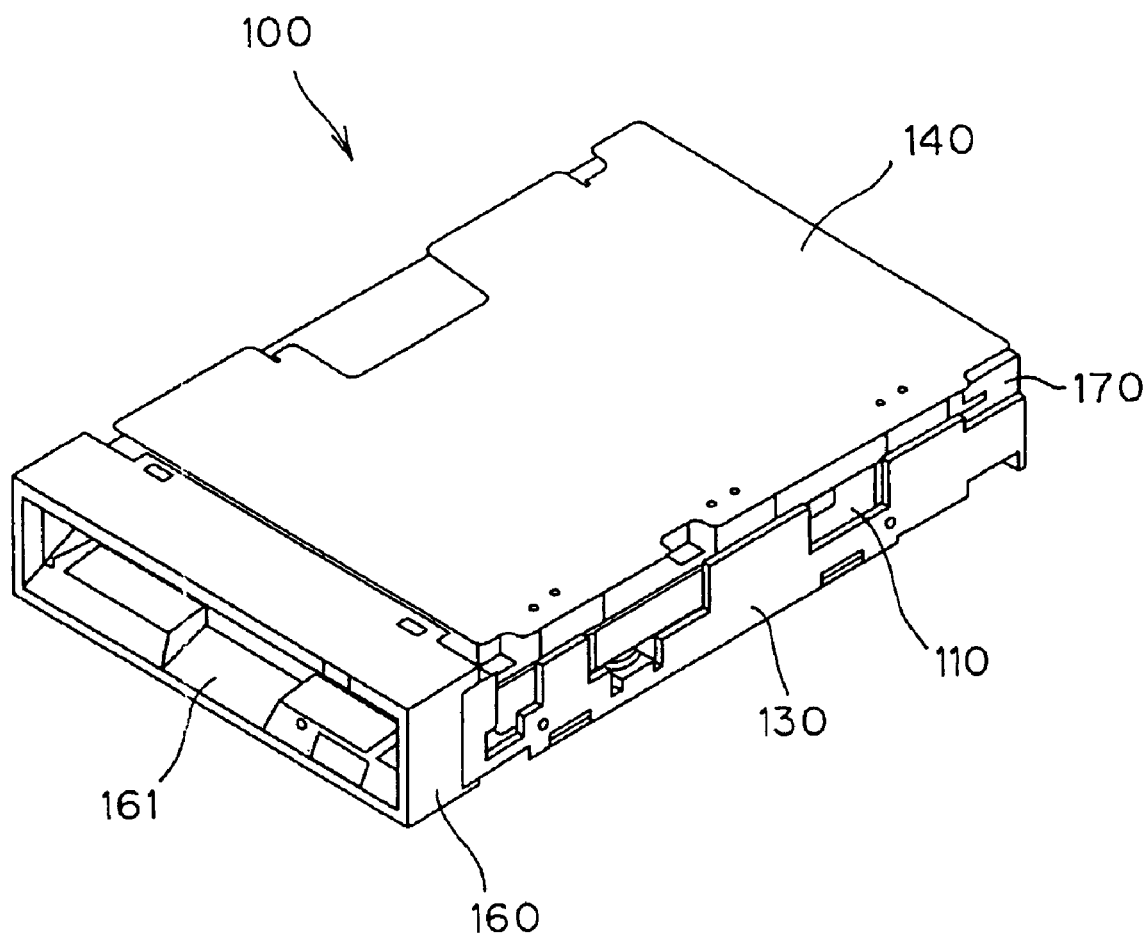
FIG. 1 is an external perspective view showing an optical information storage device into which embodiments of a collimator optical system of the present invention are built.

FIG. 1 is an external perspective view showing an example of an optical information storage device into which embodiments of a collimator optical system of the present invention are built.

The optical information storage device exemplified here has the embodiments of the collimator optical system of the present invention described later built therein so as to obtain the embodiments of the optical information storage device of the present invention.

An optical information storage device 100 exemplified here is a MO device that uses a magnet-optical (MO) disk as a recording medium. The optical information storage device 100 includes a drive base 110 made of an aluminum alloy as a base thereof, and the drive base 110 is mounted on a frame 130 via four pieces of vibration-proof rubber 120 (refer to FIG. 2). The drive base 110 has a top cover 140 and a bottom cover 150 (refer to FIG. 2) screwed shut thereon respectively.

The frame 130 has a front panel 160 mounted thereon. The front panel 160 has a loading slot 161 provided thereon for the sake of inserting into the optical information storage device 100 an optical disk cartridge containing a disciform optical disk as an example of an information recording medium according to the present invention.

The optical information storage device 100 has a connector 170 electrically connecting the optical information storage device 100 to equipment such as a computer mounted on its rear end as against its front end on which the front panel 160 is mounted.

Figure 2:
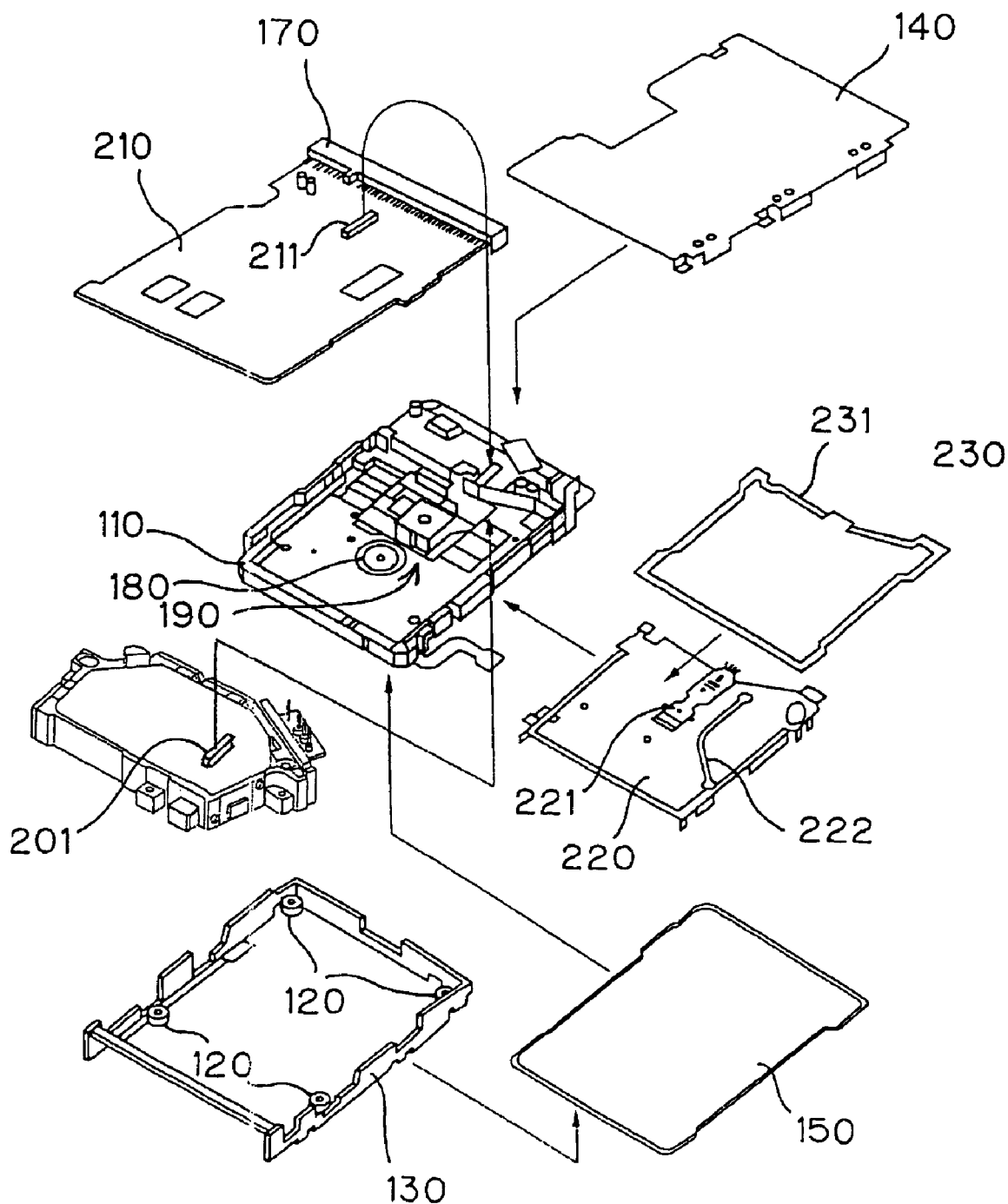
FIG. 2 is an exploded perspective view of the optical information storage device.

FIG. 2 is an exploded perspective view of the optical information storage device shown in FIG. 1.

The drive base 110 has a spindle motor 180 holding and rotating the optical disk mounted thereon.

The drive base 110 also has an optical head having a mobile optical assembly 190 capable of traveling radially on the optical disk and a fixed optical assembly 200 fixed on the drive base 110 mounted thereon, where the fixed optical assembly 200 is fixed on a backside of the drive base 110. The fixed optical assembly 200 has a connector 201 electrically connecting to a printed circuit board 210 described later.

FIG. 2 shows a bias magnet assembly 221 turning bias magnetic field applied to the optical disk on and off by sliding a permanent magnet, an optical disk cartridge loading assembly 220 having a closing arm 222 opening and closing a shutter of the optical disk cartridge. The optical disk cartridge loading assembly 220 is screwed shut and fixed on a surface side of the drive base 110. An insulating sheet 230 is mounted on the surface side of the optical disk cartridge loading assembly 220, and a seal member 231 preventing dust from adhering to the optical disk by improving seal performance is mounted on a perimeter of the insulating sheet 230.

FIG. 2 also shows the backside of the printed circuit board 210 having a connector 211 connecting to the connector 201 of the fixed optical assembly 200 and the connector 170 electrically connecting to external equipment mounted thereon and including a drive control circuit controlling driving of the optical head. The printed circuit board 210 is mounted on the drive base 110 via the insulating sheet 230 thereon so that the connector 211 of the printed circuit board 210 and the connector 201 of the fixed optical assembly 200 are mutually connected, and is screwed shut and fixed on the drive base 110.

Furthermore, the drive base 110 has the top cover 140 screwed shut and fixed thereon via the printed circuit board 210 thereon, and has the bottom cover 150 screwed shut and fixed on the backside thereof. Lastly, the drive base is fixed on the frame 130 via the vibration-proof rubber 120.

Figure 3:
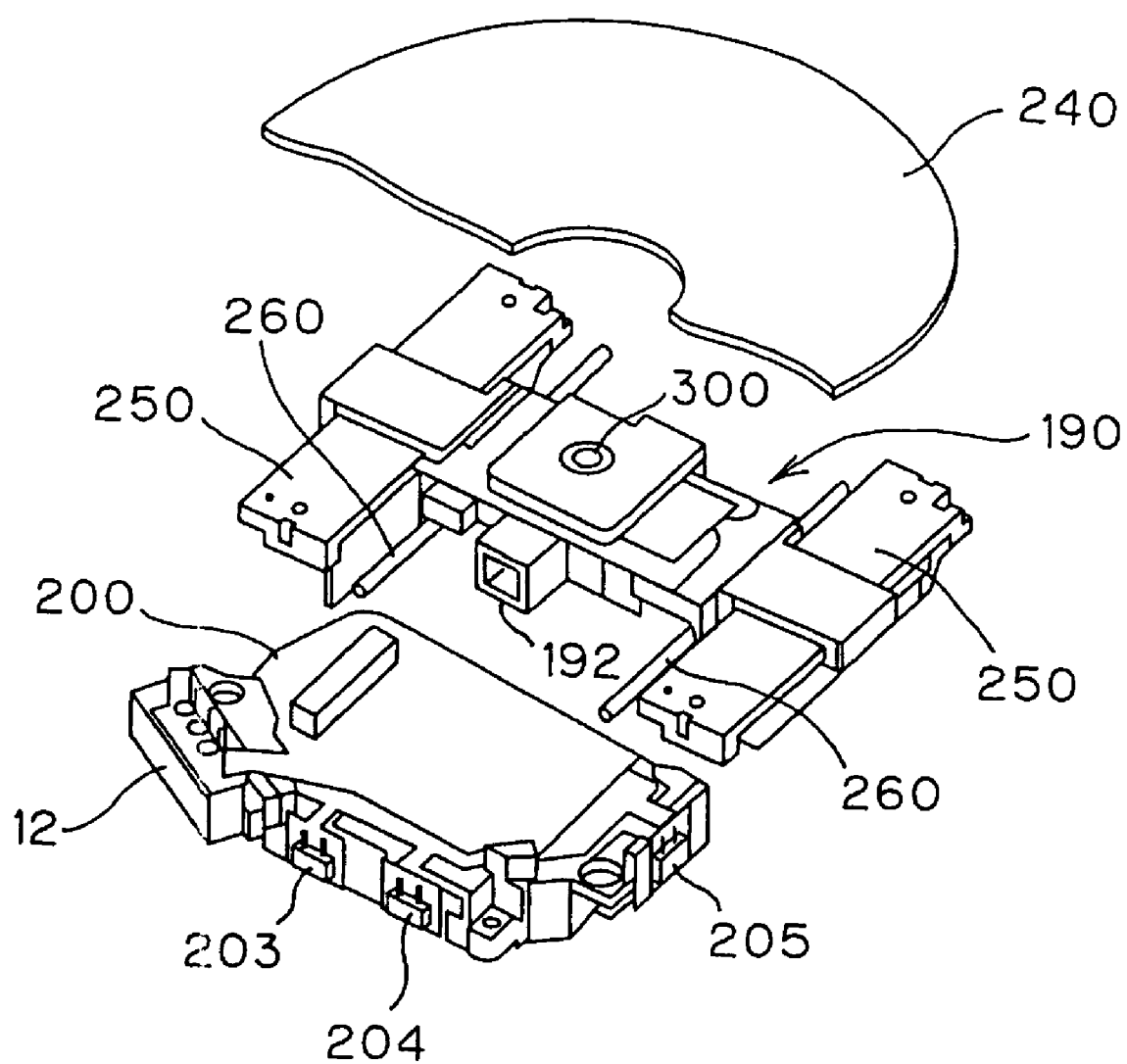
FIG. 3 is a perspective view showing a placement relation between a fixed optical assembly and a mobile optical assembly, in which a drive base is not shown.

FIG. 3 is a perspective view showing a placement relation between a fixed optical assembly and a mobile optical assembly, in which a drive base is not shown.

The fixed optical assembly 200 has a laser diode 12 generating a laser beam used for reading and writing of information as an example of the light source according to the present invention, a light detector 203 detecting a signal according to the information stored on an optical disk 240 included in the light reflected by the optical disk 240, a light detector 204 detecting a deviation of a focusing spot from concentric tracks provided on the optical disk as a place for storing the information, and a light detector 205 detecting the deviation of a focus of the focusing spot.

The mobile optical assembly 190 is driven by a pair of magnetic circuits 250, and travels along a pair of guide rails 260 in a radial direction of the optical disk 240. The mobile optical assembly 190 has an actuator built therein, which fine-tunes the position of an objective lens 300 and thereby adjusts the focus of the focusing spot and locates the focusing spot on the track. The mobile optical assembly 190 also has a nozzle 192 having a square cross section provided thereto, and the laser beam emitted by the laser diode 12 of the fixed optical assembly 200 and rendered as parallel light as will be described later gets incident on the mobile optical assembly 190 from the nozzle 192. The light reflected by the optical disk 240 returns to the fixed optical assembly 200 from the nozzle 192. Furthermore, the mobile optical assembly 190 also has an upright mirror rendering the laser beam from the nozzle 192 incident on the objective lens 300 built therein.

Figure 4:
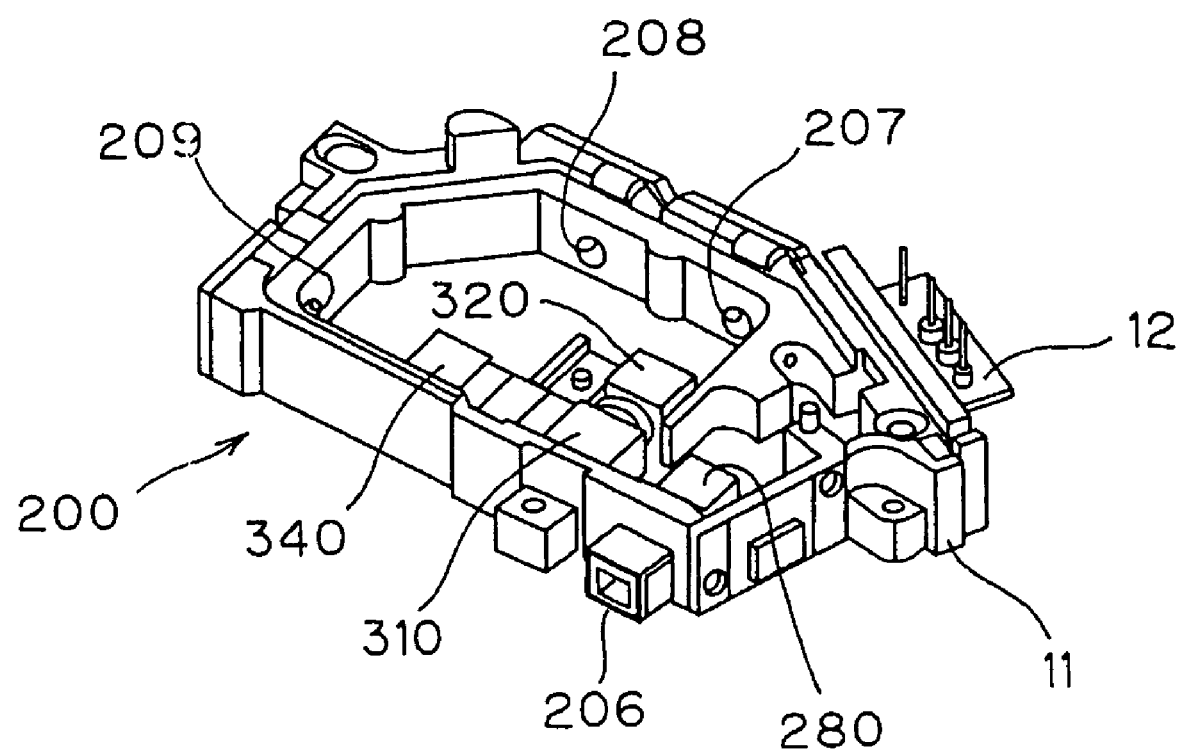
FIG. 4 is a perspective view showing an internal structure of the fixed optical assembly.

FIG. 4 is a perspective view showing an internal structure of the fixed optical assembly.

The fixed optical assembly 200 has a nozzle 206 corresponding to the nozzle 192 of the mobile optical assembly 190 shown in FIG. 3 provided thereto, and a polarized beam splitter 280 is placed in depth of the nozzle 206.

The laser beam emitted by the laser diode 12 is diffused light, which is converted to parallel light by a collimator lens mounted as will be described later in a hole made on a base 11 of the fixed optical assembly 200. The flux of the laser beam has an elliptical cross section. For this reason, the laser diode 12 is placed obliquely to the direction in which the laser beam gets incident on the polarized beam splitter 280. And the laser beam emitted by the laser diode 12 and converted to the parallel light by the collimator lens is refracted by a prism not shown so that it is deformed to the luminous flux having a circular cross section and gets incident on the polarized beam splitter 280 thereafter.

The laser beam having passed through the polarized beam splitter 280 to the mobile optical assembly 190 by way of the nozzle 206. And a part of the light returned from the mobile optical assembly 190 is reflected to the upper left in FIG. 4 by the polarized beam splitter 280.

The fixed optical assembly 200 has beam splitters 310, 340 and an analyzer 320 placed in the center thereof. The light reflected to the upper left in FIG. 4 by the polarized beam splitter 280 reaches the light detectors by passing the beam splitters 310, 340 and analyzer 320 and passing holes 207, 208 and 209 made on the frame of the fixed optical assembly 200.

Here, a comparative example of the collimator optical system and its problems will be described, and then the embodiments of the collimator optical system of the present invention will be described.

Figure 5:
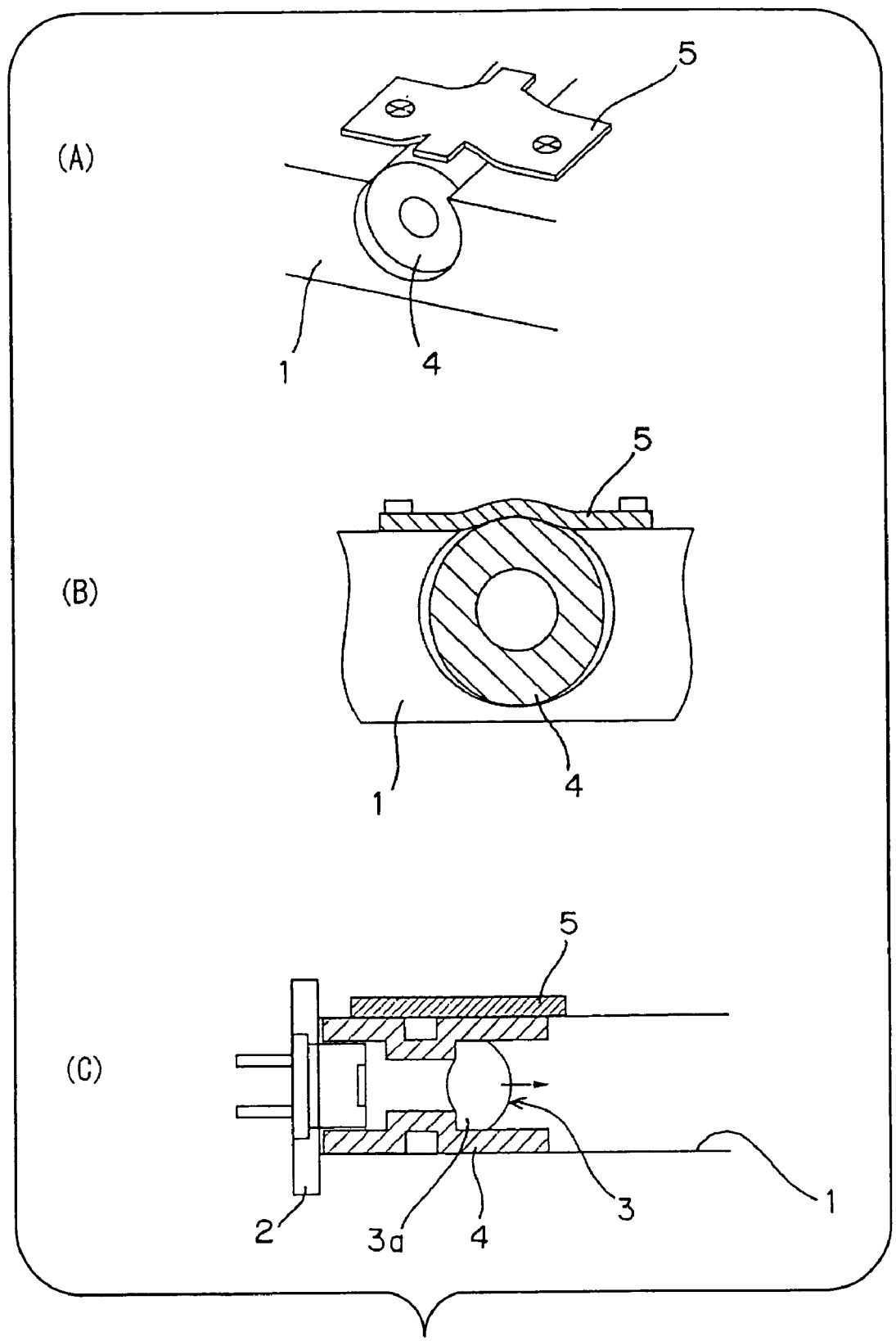
FIG. 5 are diagrams representing a comparative example of the collimator optical system.

Part (A) of FIG. 5 is a perspective view, part (B) is a front view and part (C) is a sectional view representing the comparative example of the collimator optical system.

The collimator optical system has a base 1 made of aluminum, a laser diode 2 emitting the diffused pencils of light, a collimator lens 3 as a glass mold lens made of a single material of BK7 (a kind of a nitric material), a lens holder 4 using a brass material of a smaller linear expansion coefficient than aluminum, and a plate spring 5. However, the perspective view in the part (A) and the front view in the part (B) of FIG. 5 show the state of having removed the laser diode 2. The following description will use the laser diode 2 as a reference of the directions of the members so that the side close to the laser diode 2 will be referred to as the front side and the side far from the laser diode 2 will be referred to as the backside. The collimator lens 3 has the overhang (edge section) provided on its rim, and the front side of the edge section is bonded to the lens holder 4 so as to have the collimator lens 3 held by the lens holder 4. The lens holder 4 is fixed on the base 1 by being pressed against it by the plate spring 5, namely being pressed in line contact almost in its entirety from a foremost part to a backmost part of the lens holder 4 except for a concave part for positional adjustment. For this reason, the highest pressure is exerted around a centerline of the plate spring 5. As such a method of fixation is adopted, a travel distance of the collimator lens 3 in conjunction with the temperature change is minimized. However, the collimator lens 3 itself is loaded by such a structure.

Here, assuming the case where the collimator optical system of the structure shown in FIG. 5 is applied to the optical information storage device having the objective lens of which NA is 0.55 and the wavelength of the laser diode 2 is 685 nm (hereafter, this case is represented as "red-colored low NA"), consideration is given to a wave aberration occurring on the light focusing point of the objective lens due to wavelength dependence of the refractive index of the collimator lens and thermal extension of the collimator optical system. Here, the wave aberrations which are assumed are the wave aberration on temperature change occurring when ambient temperature changes from room temperature of 20 degrees C. to high temperature of 60 degrees C. and the wave aberration on transient response occurring along with the light source wavelength variation caused by a change of a luminescence volume from 5 mW to 50 mW at the moment of switching from an information reproducing operation to an information recording operation. Here, "on transient response" represents the moment of defocusing caused by switching to the information recording operation, increasing luminescence power of the laser diode 2 and extending the light source wavelength.

Assuming that the objective lens is an ideal lens and the collimator lens 3 is a double-sided aspheric lens of 5-mm focal length, chromatic aberration occurring on the light focusing point of the objective lens is 0.03 mm/nm. As for thermal expansion and contraction of the base 1, an amount of expansion and contraction is calculated on the assumption of the structure of the fixed optical assembly shown in FIG. 4. Summing up these, the wave aberration of 13 mlrms (the change in the light source wavelength is 8 nm in this case)

occurs as the wave aberration on temperature change, and the wave aberration of 9 mlrms (the change in the light source wavelength is 3 nm in this case) occurs as the wave aberration on transient response.

In the case of the "red-colored low NA," even the collimator optical system of the structure shown in FIG. 5 has the wave aberration of less than 15 mlrms both on temperature change and on transient response. Therefore, a spot peak intensity reduction amount due to the objective lens is less than one percent so that sufficient performance can be obtained as the performance required of the collimator optical system and optical information storage device. As against such a case of the "red-colored low NA," consideration is given to the wave aberration in the case of sided "blue-colored low NA" using blue laser diode of 405-nm light source wavelength as the laser diode 2 for the sake of larger capacity. In this case, even if a lens face form and thickness are optimally designed on the assumption that the focal length of the collimator lens is the same, the chromatic aberration occurring on the light focusing point of the objective lens is 0.132 mm/nm which is about four times larger than that in the case of the "red-colored low NA." Thus, the wave aberration of 6 mlrms (the change in the light source wavelength is 3 nm in this case) occurs as the wave aberration on temperature change, and the wave aberration of 22 mlrms (the change in the light source wavelength is 1 nm in this case) occurs as the wave aberration on transient response.

Thus, in the case of the "blue-colored low NA," the wave aberration on transient response exceeds 20 mlrms, and so it does not satisfy the performance required of the collimator optical system and optical information storage device. This is because the light source wavelength variation of the refractive index of BK7 constituting the collimator lens is much larger in a 400 nm band than in a 660 nm band.

Figure 6:
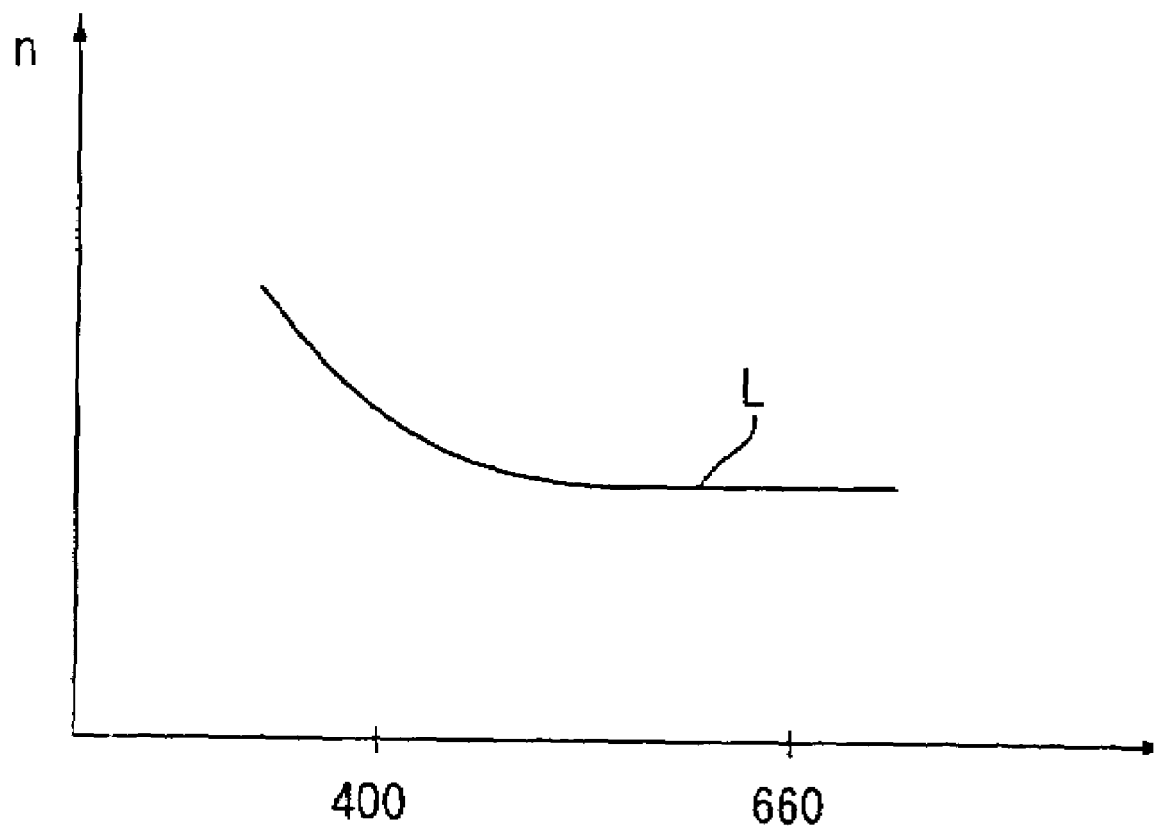
FIG. 6 is a graph representing wavelength variation of a refractive index.

FIG. 6 is a graph representing the wavelength variation of the refractive index.

In FIG. 6, a horizontal axis indicates the wavelength and a vertical axis indicates the refractive index. While a curve L of the graph is almost level in the 660 nm band, it shows a significant incline in the 400 nm band. Therefore, a slight change in the wavelength of the light source causes a large wave aberration in the 400 nm band. Such a trend in the wavelength variation as shown in FIG. 6 is not limited to BK7 but is a common trend as to many chemical materials.

As described above, the wave aberration on transient response exceeds 20 mlrms in the case of the "blue-colored low NA" due to such a wavelength variation of the refractive index. As for the wave aberration on temperature change, however, the wave aberration is less than that in the case of the "red-colored low NA" due to a balance between increase in the wavelength variation and decrease in the light source wave aberration on temperature change.

Furthermore, in the case of the "blue-colored high NA" using the objective lens of NA 0.85, the wave aberration is further deteriorated because the chromatic aberration occurring on the light focusing point of the objective lens is 0.046 mm/nm. As a result of this, the wave aberration on temperature change is 6 mlrms and the wave aberration on transient response is 26 mlrms.

Here, in order to curb such a large wave aberration on transient response as described above caused by using the blue laser diode as the laser diode 2 for the light source of the collimator optical system, it is thinkable, instead of using the collimator lens 3, to use the achromatic lens putting multiple pieces of glass together to curb the chromatic aberration such as the one used for a commercially available microscope lens. In that case, however, the wave aberration on temperature change becomes such a large value as 36 mlrms so that the performance of the collimator optical system and optical information storage device is further lowered.

To curb the wave aberration on transient response, it is also thinkable to use a plastic lens having a diffraction grating with the chromatic aberration curbed by forming a diffraction grating of which grating pitch is adequately designed either on an incidence side or on an emission side. As for such a plastic lens having the diffraction grating, it is theoretically possible to render the chromatic aberration infinitely closer to zero. As its lens material is plastic, however, a thermal expansion coefficient and a temperature coefficient of the refractive index are so large that the focal length is extended by 10 mm or more if the temperature changes from 20 degrees C. to 60 degrees C. as opposed to a glass lens. As a result of this, the wave aberration on temperature change becomes such a large value as 59 mlrms, which is even larger than the case of using the achromatic lens.

To summarize the above, if the blue laser diode and the objective lens of high NA are adopted for the sake of larger capacity, there is a problem of deterioration of the wave aberration on recording (on power change) due to the chromatic aberration of the system. And if the chromatic aberration of the collimator optical system is reduced by the achromatic lens, there is a problem of shortage of a characteristic margin against the change in the ambient temperature. As the deterioration of the wave aberration on power change is a phenomenon occurring at high speed in such a short time interval as 10 nsec, it is impossible to cope with this by dynamic control of the objective lens.

Hereunder, a description will be given as to the concrete embodiments of the present invention to solve such problems arising in the comparative example.

Figure 7:
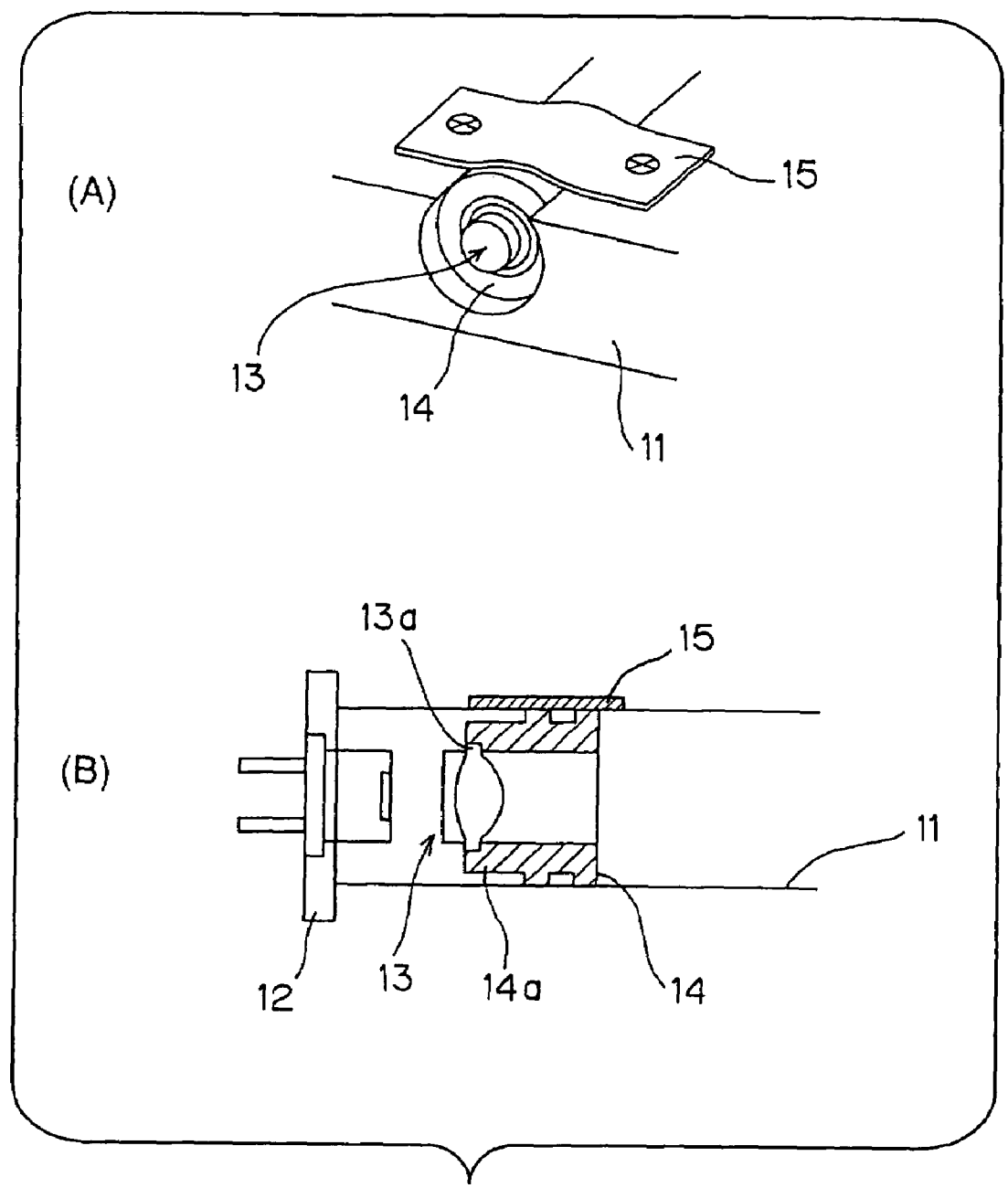
FIG. 7 is a diagram representing a first embodiment of the collimator optical system of the present invention.

Part (A) of FIG. 7 is a perspective view and (B) is a sectional view representing a first embodiment of the collimator optical system of the present invention.

The first embodiment shown in FIG. 7 has a base 11 made of aluminum of the fixed optical assembly, the laser diode 12 fixed on the base 11 and emitting blue diffused light of 405 nm, an achromatic lens 13 functioning as the collimator lens that converts the diffused pencils of light emitted by the laser diode 12 to the parallel pencils of light, a lens holder 14 made of aluminum that holds the achromatic lens 13, and a plate spring 15 fixing the lens holder 14 on the base 11.

The description of the first embodiment will also use the laser diode 12 as the reference of the directions of the members so that the side close to the laser diode 12 will be referred to as the front side and the side far from the laser diode 12 will be referred to as the backside.

The achromatic lens 13 has a two-group lens structure in which a convex lens with the refractive index of 1.71482 and a concave lens with the refractive index of 1.74173 are joined so that equivalent refractive index dispersion is almost 0 in the 400 nm band so as to have 5-mm focal length. An operating distance of the achromatic lens 13 as the collimator lens is 3.373364 mm, and the distance from a luminous point of the laser diode 12 to the surface of the front side of the achromatic lens 13 is 3.623364 mm. The achromatic lens 13 has the overhang (edge section) 13a provided on its rim, and the backside of the edge section 13a is bonded to the lens holder 14 in the first embodiment as opposed to the comparative example so as to have the achromatic lens 13 held by the lens holder 14. The lens holder 14 is fixed on the base 11 more backward than the part to which the achromatic lens 13 is bonded, and has a 1.85-mm free end 14a of which thermal extension is free provided thereto.

To calculate the wave aberration of the first embodiment as to the case where the objective lens is NA 0.85, the chromatic aberration occurring on the light focusing point of the objective lens is a very small aberration of 0.008 mm/nm and the wave aberration on transient response is also curbed to a small aberration of 5 mlrms because the collimator lens 13 is provided.

To give consideration to the case where the ambient temperature changes from 20 degrees C. to 60 degrees C., the thermal expansion of the base 11 made of aluminum extends the distance between the laser diode 12 and the achromatic lens 13. As opposed to this, the achromatic lens 13 has the backside of the edge section 13a bonded to the lens holder 14 so that the thermal expansion of the achromatic lens 13 itself reduces the distance between the laser diode 12 and the achromatic lens 13. Furthermore, the achromatic lens 13 having the two-group lens structure has smaller temperature changes of the focal length than the lens of a single material. It is possible, by putting these actions together, to curb the wave aberration when the ambient temperature changes from 20 degrees C. to 60 degrees C. to be smaller than the wave aberration on temperature change of 36 mlrms occurring on simply replacing the collimator lens of the comparative example with the achromatic lens. Moreover, according to the first embodiment, the free end 14a is provided to the lens holder 14 in order to curve the wave aberration on temperature change to be even smaller.

According to the first embodiment, both the base 11 and lens holder 14 are made of aluminum. While the thermal expansion and contraction of the base 11 are restricted by a peripheral structure and so on, the free end 14a can freely perform the thermal expansion and contraction. For this reason, when the ambient temperature changes from 20 degrees C. to 60 degrees C., the base 11 extends by about 2.15 mm while the free end 14a of 1.85-mm length is fully extended by a general linear expansion coefficient of aluminum $24'10-6$/degrees C. and moves the achromatic lens 13 forward by $1.85'(60-20)'24'10-6=1.776$ mm. The wave aberration on temperature change is reduced to less than 15 ml if such an action of the free end 14a is added to the above action.

Thus, according to the first embodiment shown in FIG. 7, the wave aberration is curbed to less than 15 ml both on transient response and on temperature change by a simple and compact structure. For this reason, it is possible to obtain a large-capacity optical information storage device of high reliability that can give the performance nearly at the maximum in a temperature range of 20 degrees C. to 60 degrees C. and in an output range of 50 mW or less even in the case of using the light of which light source wavelength is 450 nm or less and refractive index dispersion of the lens material is large.

Figure 8:
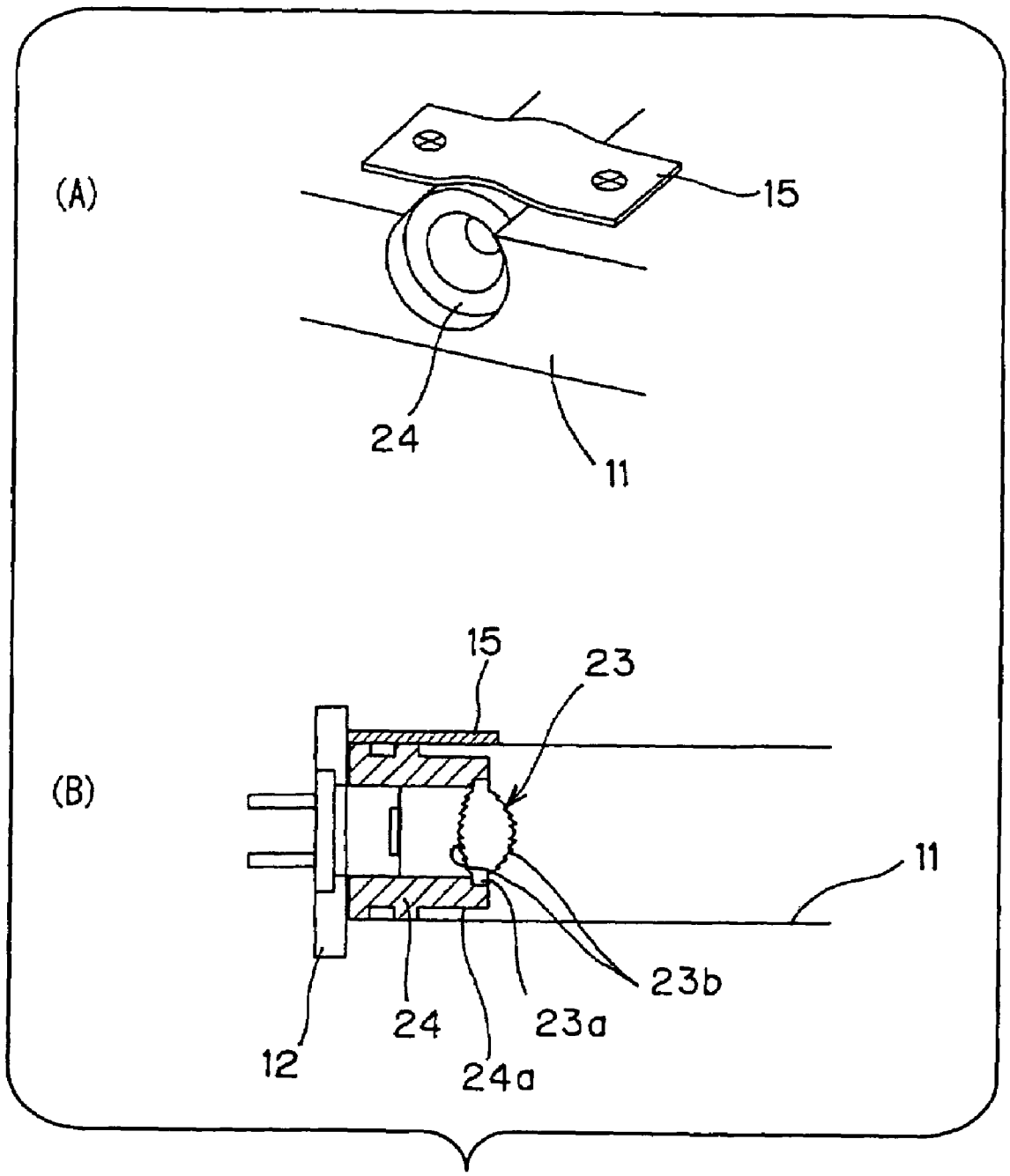
FIG. 8 is a diagram representing a second embodiment of the collimator optical system of the present invention.

Part (A) of FIG. 8 is a perspective view and part (B) is a sectional view representing a second embodiment of the collimator optical system of the present invention.

A second embodiment shown in FIG. 8 includes a plastic lens 23 and a lens holder 24 in place of the achromatic lens 13 and lens holder 14 of the first embodiment, and also includes the base 11, laser diode 12 and plate spring 15 as with the first embodiment.

The description of the second embodiment will also use the laser diode 12 as the reference of the directions of the members so that the side close to the laser diode 12 will be referred to as the front side and the side far from the laser diode 12 will be referred to as the backside.

The plastic lens 23 has the overhang (edge section) 23a provided on its rim, and the front side of the edge section 23a is bonded to the lens holder 24 in the second embodiment so as to have the plastic lens 23 held by the lens holder 24. The plastic lens 23 has diffraction gratings 23b counteracting a focal length change due to the wavelength change of the light provided on both the incidence face and emission face so that the focal length is almost constantly 5 mm in the 400 nm band irrespective of the wavelength change of the light. The distance from the luminous point of the laser diode 12 to the surface of the front side of the plastic lens 23 is 3.668 mm.

The lens holder 24 is made of a plastic resin of which linear expansion coefficient is $6'10-5$ and is fixed on the base 11 more forward than the part to which the plastic lens 23 is bonded, and has a 1.65-mm free end 24a of which thermal expansion and contraction is free provided thereto.

To calculate the wave aberration as to the case where the objective lens is NA 0.85 as with the first embodiment, the wave aberration on transient response is curbed to the small aberration of 5 mlrms because the plastic lens 23 having the diffraction grating 23b is used.

To give consideration to the case where the ambient temperature changes from 20 degrees C. to 60 degrees C., the linear expansion coefficient of the plastic lens 23 is $6'10-5$ degrees C. which is 100 times that of the glass in the second embodiment so that the focal length is extended by 10 mm or more due to the thermal expansion of the plastic lens 23. For this reason, the front side of the edge section 23a of the plastic lens 23 is bonded to the lens holder 24 in the second embodiment so that the plastic lens 23 itself is moved by the thermal extension in the direction counteracting the focal length change. The wave aberration on temperature change is curbed by this action to the wave aberration smaller than 59 mlrms which is the wave aberration on temperature change occurring on simply replacing the collimator lens of the comparative example with the plastic lens having the diffraction grating. According to the second embodiment, the free end 24a is further provided to the lens holder 24 in order to curve the wave aberration on temperature change to be even smaller.

As opposed to the first embodiment, the free end 24a enlarges the distance between the laser diode 12 and the plastic lens 23 by means of thermal expansion. As the lens holder 24 is made of the plastic resin of which linear expansion coefficient is $6'10-5$, the free end 24a which is as short as 1.65 mm shows a great extension of $1.65'(60-20)'60'10-5=3.96$ mm against the temperature change from 20 degrees C. to 60 degrees C. in the case of fully performing thermal expansion and contraction so that the wave aberration on temperature change becomes less than 15 mlrms.

Thus, according to the second embodiment, the wave aberration is curbed to less than 15 ml both on transient response and on temperature change by a simple and compact structure as with the first embodiment. For this reason, it is possible to obtain a large-capacity optical information storage device of high reliability that can give the performance nearly at the maximum in a temperature range of 20 degrees C. to 60 degrees C. and in an output range of 50 mW or less even in the case of using the light of which light source wavelength is 450 nm or less and refractive index dispersion of the lens material is large.

The description indicates the achromatic lens of the two-group lens structure as an example of the achromatic lens according to the present invention. However, the achromatic lens according to the present invention may have a composite structure of three or more groups of lenses.

The description indicates the plastic lens having the diffraction gratings provided on both the incidence face and emission face as an example of the plastic lens according to the present invention. However, the plastic lens according to the present invention may have the diffraction gratings provided only on one of the incidence face and emission face.

The description indicates the lens holder which is cylindrical as an example of the lens holder according to the present invention. However, the lens holder according to the present invention is not limited to the cylindrical lens holder but may be any lens holder of which overhang is bonded to hold the lens.

The description indicates the base made of aluminum as an example of the base according to the present invention. However, the base according to the present invention may be made of a metal other than aluminum or nonmetal such as ceramic.

What is claimed is:

1. A collimator optical system comprising:
   a base;
   a light source fixed on the base and emitting diffused pencils of light;
   a plastic lens having an overhang on its rim and a diffraction grating counteracting a focal length change due to a wavelength change of light, the lens converting diffused pencils of light emitted by the light source to parallel pencils of light; and
   a lens holder fixed on the base and adhered to the light source side of the overhang of the plastic lens to hold the plastic lens.

2. The collimator optical system according to claim 1, in which the light source emits blue light.

3. The collimator optical system according to claim 1, in which the lens holder is fixed on the base at a position more forward than the position at which the overhang of the plastic lens adheres to the lens holder when a side closer to the light source is a front side.

4. The collimator optical system according to claim 3, in which the lens holder has a linear expansion coefficient equal to or larger than the linear expansion coefficient of the base.

5. The collimator optical system according to claim 3, in which the base is metallic and the lens holder is plastic.

* * * * *